Feb. 16, 1971  E. ALLARIA  3,564,375
CONTROL SYSTEM FOR ELECTRIC WINDSHIELD WIPERS HAVING
DYNAMIC BRAKING DEFINED BY SHORT CIRCUIT
Filed Oct. 24, 1967  2 Sheets-Sheet 1

INVENTOR
EUGENIO ALLARIA

BY *Stowell & Stowell*

ATTORNEYS

United States Patent Office 3,564,375
Patented Feb. 16, 1971

3,564,375
CONTROL SYSTEM FOR ELECTRIC WINDSHIELD WIPERS HAVING DYNAMIC BRAKING DEFINED BY SHORT CIRCUIT
Eugenio Allaria, Milan, Italy, assignor to Fabbrica Italiana Magneti Marelli S.p.A., Milan, Italy, a corporation of Italy
Filed Oct. 24, 1967, Ser. No. 677,694
Claims priority, application Italy, Oct. 26, 1966, 29,294/66
Int. Cl. B60s 1/08
U.S. Cl. 318—443               6 Claims

ABSTRACT OF THE DISCLOSURE

A windshield wiper control system of motor vehicles comprises members provided for the electric braking of the operating motor including switches, controlled by a manual change-over switch which controls the operation of an electric motor. In the case of motors of the permanent magnet excitation-type the electric braking is obtained by short circuiting the rotor of the motor.

---

This invention relates to a control device for electric windshield wipers of the type incorporating a three position change-over switch to stop the windshield wiper, to operate it continuously or intermittently in conjunction with a time switch, the device including a limit switch to set the wiper brush automatically to zero.

The purpose of the present invention is to provide a control device of the above described type capable of assuring the regular stopping of the wiping brush at the end of its stroke, i.e., both at the end of the continuous operation of the windshield wiper and at the end of each single wiping stroke when the device operates intermittently.

According to the present invention this is attained by electrical braking of the motor, more specifically by employing the braking each time an end stroke switch is open with the change-over switch in the continuous position, or when the change-over switch is in the intermittent position with the motor idle.

When using a permanent magnet excited motor, the electric braking is obtained at the end of the stroke of the windshield wiper, by short-circuiting the motor through a circuit comprising, in addition to the armature winding, the end-stroke contact and one contact of the change-over switch in resting position.

During intermittent operation the motor is short-circuited between one and the next successive wiping cycle through a circuit comprising the armature winding, the limit switch contact, a controlled time switch contact and a contact of the change-over switch in intermittent position.

When using a compound motor, provided with a braking winding, braking is obtained at the end of the stroke of the windshield wiper by closing the armature winding by means of the braking winding and one change-over switch contact and, when the device operates intermittently, by closing the induced winding in a circuit including a time switch controlled contact.

The invention will now be described by way of example, reference being made to a device using a permanent magnet excited motor.

Figure 1:
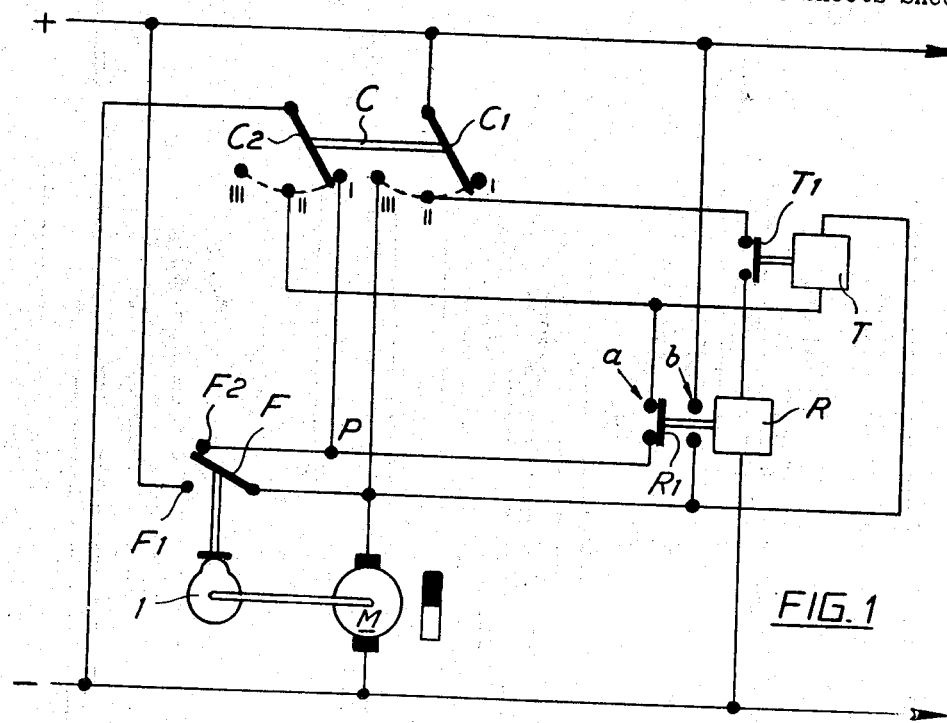
FIG. 1 is a schematic diagram of the device according to the invention, in which the windshield wiper driving motor field is supplied by a permanent magnet.

Referring now to the drawings, the device is shown in its position of rest. With reference to FIG. 1, M is a permanent magnet excited motor, designed to drive a windshield wiper (not shown in the figure); and F is a movable end-stroke contact, driven by cam 1, said cam being driven, in turn, by the motor. The end-stroke contact F is shown in the figure in open position and functions to yield regular operation of the motor during the period of time required by the windshield wiper to perform a full stroke, that is, to reach its end-stroke position, in case the normal operation of the motor fails when the wiper brush is in an intermediate position on the windshield.

With further reference to FIG. 1, when contact F is in closed position it connects with contact $F_1$, receiving plus from the line. C indicates a manually operable change-over switch allowing continuous or intermittent operation, or shutting off of the motor. The switch C comprises two linked and moving together contacts $C_1$ and $C_2$, each of which may assume any one of three different contact positions, i.e., a rest position I, a second position II corresponding to intermittent operation and a third position III corresponding to continuous operation of the windshield wiper.

When the change-over switch is at position I, motor M does not receive power from the supply lines. If the motor is in the shown position of F, the armature is shorted through $F$–$F_2$–$C_2$–ground. If F contacts $F_1$, the motor runs until it reaches the illustrated position.

In the configuration of switches shown in FIG. 1, the motor is subjected to abrupt braking, to thereby stop it and to stop the wiper brush at the very moment in which it reaches the end of its stroke.

During continuous operation, normal energizing of the motor from the plus to the ground line is performed through contact $C_1$ in position III.

During intermittent operation with selector switch C in position II, a time switch starts operating, said time switch comprising a thermal switch T and relay R with a contact having two contact making positions $a$ and $b$.

The relay is fed through contact $C_1$ in position II and through contact $T_1$ of thermal switch T. When the relay is energized, its contact $R_1$ assumes position $b$, so that motor M is energized and the feed line of the thermal switch T is closed by means of contact $C_2$. The operation of the motor and, consequently, the cycle of wiping strokes performed by the windshield wiper comes to a standstill, as soon as switch T opens after a predetermined time by the effect of heat. Contact $T_1$ moves to the right thus deenergizing relay R and therefore causes $R_1$ to move away from position $b$.

In FIG. 1, said contact $R_1$ is shown in position $a$, which is the resting position of the device, or the interval between one and the other wiping-stroke cycle, when the device operates intermittently.

Bearing in mind that, during intermittent performance, contact $C_2$ is in position II, it is easily understood that, at the end of each wiping-stroke cycle, the motor is short-circuited through a circuit defined by the armature winding of motor M, end-stroke contact F in connection with $F_2$, contact $R_1$ of R in position $a$, contact $C_2$ in position II.

Due to electric braking action the stopping of the wiper brush at the end of its stroke, i.e., at the end of each wiping cycle, is effected.

Figure 2:
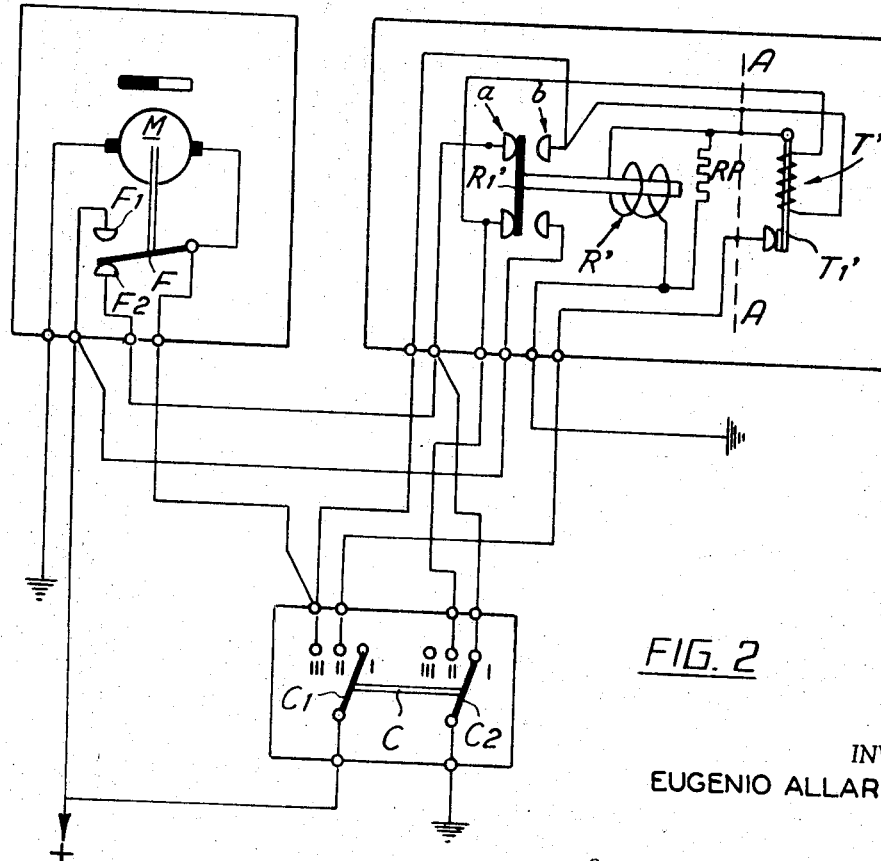
FIG. 2 shows a particular embodiment of the diagram of the inner and outer connections of the circuit shown in FIG. 1.

FIG. 2 is a diagram of the driving device according to FIG. 1. Said figure also shows a simple form of realization of the relay and of the thermal switch, identified by the same letters of FIG. 1, but bearing a prime suffix. The other parts of the device, corresponding to those shown in FIG. 1, are identified by the same symbols. FIG. 2 also shows one arrangement of the various component parts of the device. The cutout and the relay can constitute a separate or modular unit and be, preferably, connected both, mechanically and electrically, by means of a plugged coupling. A—A shows a modular coupling line. It is obvious that the adoption of this arrangement greatly facilitates replacement and change of the component parts in case of failure. The cutout and the relay can further be incorporated, either alone or together, into the driving equipment. One change-over switch can be substituted by another, equivalent switch.

Figure 3:
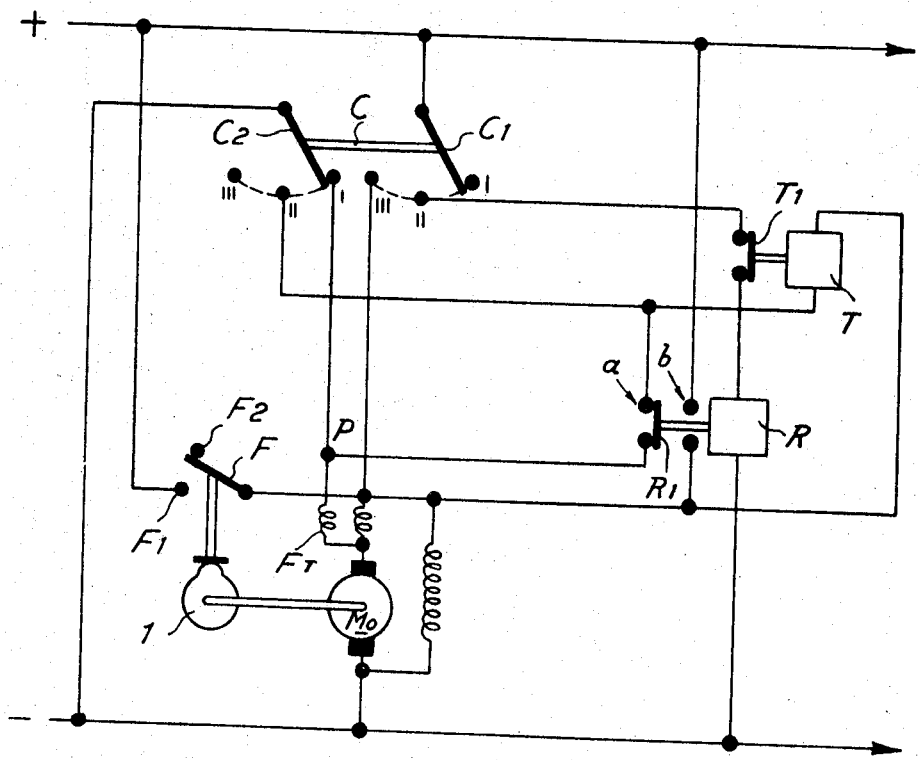
FIG. 3 shows the electric wiring diagram of the device in the case in which the motor is compound wound.

In particular, the thermal cutout can be equipped with a condenser connected in parallel with the contacts or, more advantageously, as shown in FIG. 2, a resistance RP may be provided in parallel with the relay coil. The aforesaid fully applies also in case the windshield wiper drive motor is energized by means other than the permanent magnet motor. In particular, the drive motor may be energized by a shunt field winding. Regardless of the energizing system employed, in case the motor is equipped with a suitable braking winding, the circuits have to be modified but slightly. The modification, aside from substitution of the type of field used in the motor, consists in cutting the connection of the contact with $F_2$ with point P (see FIG. 1) and in connecting the latter with the motor through the braking winding. Such a modification is illustrated in FIG. 3, in which the windshield wiper drive motor M is compound wound and is provided with a braking winding identified by $F_T$. The electric break between $F_2$ and P consists in dong away with the open-position of contact F. Therefore, during the braking action, with the change-over switch at rest is shown in I, the following circuit is defined: armature motor winding, braking winding, contact $C_2$ in position I, whereas with the change-over switch in intermittent position II, between one and the other wiping cycle, the circuit comprises braking winding, contact $R_1$ in position $a$, contact $C_2$ in position II.

From the foregoing it is seen that a further advantage of the device according to this invention, consists in adapting the device to any type of motor, since for this purpose it is sufficient to perform only small modifications such as set forth above. Another advantage of this invention consists in that, if the thermal switch T does not function properly, the motor windings are not damaged in any way.

What is claimed is:

1. A windshield wiper system adapted to operate continuously or intermittently including a motor, a three position switch having two simultaneously movable contact blades, each blade having off, continuous, and intermittent positions, a thermally actuated switch energized by one of said blades in its intermediate position and having control contacts and having a predetermined period of operation, a relay energized by the control contacts of the thermal switch and having two sets of control contacts, one set of which connects the motor across a power supply and the other set of which provides a short circuit path for the armature when the three position switch is in its intermittent position, a cam coupled to the motor and operating a switch, said cam operated switch providing a series path with the motor and connecting the motor across a power supply, characterized by
   (a) means for defining an electrical short circuit through the armature at the end of an operating cycle of a windshield wiper attached to the motor when the three position switch is in the off position,
   (b) means for defining an electrical short circuit through the armature at the end of the period of operation of the thermal switch, when the three position switch is in the intermittent position, and
   (c) wherein one of said blades defines a portion of the short circuit in both the off and intermittent positions and wherein the other of said blades defines a portion of the voltage supply path for the motor in the continuous position.

2. A windshield wiper system adapted to operate continuously or intermittently including a motor, a three position switch having two simultaneously movable contact blades, each blade having off, continuous, and intermittent positions, a thermally actuated switch energized by one of said blades in its intermediate position and having control contacts and having a predetermined period of operation, a relay energized by the control contacts of the thermal switch and having two sets of control contacts, a cam coupled to the motor and operating a double throw single pole switch, said cam operated switch in one position providing a series path with the motor and connecting the motor across a power supply, the cam operated switch in its other position defining an electrical short circuit through the armature at the end of an operating cycle of a windshield wiper attached to the motor through the said one blade of said three position switch when it is in the off position or through one set of control contacts of said relay and said one blade of the three position switch when it is in the intermediate position, the other set of control contacts connecting the motor across a power supply, the blade of said other three position switch in its intermediate position establishing a circuit through said relay, and said thermal switch control contacts of the thermal switch to energize the relay.

3. The system of claim 2 wherein said relay is shunted by a resistor.

4. The system of claim 2 wherein said relay is shunted by a condenser.

5. The system of claim 2 wherein said time delay switch or said relay is mounted in a separate casing or the like to thereby define a modular unit of assembly/repair.

6. A windshield wiper system adapted to operate continuously or intermittently including a motor, a three position switch having two simultaneously movable contact blades, each blade having off, continuous, and intermittent positions, a thermally actuated switch energized by one of said blades in its intermittent position and having control contacts and having a predetermined period of operation, a relay energized by the control contacts of the thermal switch and having two sets of control contacts, one set of which connects the motor across a power supply and the other set of which provides a short circuit path for the armature when the said one blade of the said three position switch is in its intermittent position, a cam coupled to the motor and operating a switch, said cam operated switch when closed providing a series path with the motor and connecting the motor across a power supply, a braking coil connected between said motor and the off position of said one blade, the blade of said other three position switch in its intermediate position establishing a circuit through said relay and through said thermal switch control contacts of the thermal switch to energize the relay.

References Cited

UNITED STATES PATENTS

| 3,148,399 | 9/1964 | Ziegler | 15—250.12X |
| 3,351,836 | 11/1967 | Kearns | 318—443 |

FOREIGN PATENTS

| 775,631 | 5/1957 | Great Britain | 15—250.12 |
| 1,285,849 | 1/1962 | France | 318—443 |

ORIS L. RADER, Primary Examiner

R. J. HICKEY, Assistant Examiner

U.S. Cl. X.R.

15—250.12